United States Patent [19]

Feist et al.

[11] Patent Number: 5,565,144

[45] Date of Patent: Oct. 15, 1996

[54] TIN OXIDE BASED CONDUCTIVE POWDERS AND COATINGS

[75] Inventors: Thomas P. Feist, Hockessin; Jacob Hormadaly; Howard W. Jacobson, both of Wilmington, all of Del.

[73] Assignee: E. I. Du Pont de Nemours and Company, Wilmington, Del.

[21] Appl. No.: 427,313

[22] Filed: Apr. 24, 1995

Related U.S. Application Data

[62] Division of Ser. No. 292,895, Aug. 18, 1994.

[51] Int. Cl.$^6$ .............. H01B 1/06; H01B 1/08; H01B 1/16
[52] U.S. Cl. .............. 252/518; 106/443; 423/593
[58] Field of Search ............ 252/518; 106/443; 423/593

[56] References Cited

U.S. PATENT DOCUMENTS

| | | | |
|---|---|---|---|
| 2,962,452 | 11/1960 | Counts et al. | 252/520 |
| 3,718,550 | 2/1973 | Klein | 204/67 |
| 3,950,240 | 4/1976 | Cookfair | 204/290 |
| 4,065,743 | 12/1977 | Wahlers et al. | 29/620 |
| 4,215,020 | 7/1980 | Wahlers et al. | 252/518 |
| 4,340,508 | 7/1982 | Wahlers et al. | 252/520 |
| 4,373,013 | 2/1983 | Yoshizumi | 428/570 |
| 4,431,764 | 2/1984 | Yoshizumi | 524/409 |
| 4,452,830 | 6/1984 | Yoshizumi | 427/215 |
| 4,514,322 | 4/1985 | Swoboda | 252/518 |
| 4,536,329 | 8/1985 | Hormadaly | 252/518 |
| 4,537,703 | 8/1985 | Hormadaly | 252/518 |
| 4,548,741 | 10/1985 | Hormadaly | 252/518 |
| 4,565,590 | 1/1986 | Grosse et al. | 148/431 |
| 4,613,539 | 9/1986 | Hormadaly | 428/210 |
| 4,654,166 | 3/1987 | Hormadaly | 252/518 |
| 4,655,965 | 4/1987 | Kuo | 252/518 |
| 4,655,966 | 4/1987 | Guillaumon et al. | 252/518 |
| 4,707,346 | 11/1987 | Hormadaly | 423/518 |
| 4,873,352 | 10/1989 | Kobashi et al. | 556/105 |
| 4,986,933 | 1/1991 | Asada et al. | 252/518 |
| 5,059,497 | 10/1991 | Prince et al. | 429/193 |
| 5,071,676 | 12/1991 | Jacobson | 427/214 |
| 5,236,737 | 8/1993 | Linton | 427/126.3 |
| 5,376,308 | 12/1994 | Hirai et al. | 252/518 |

FOREIGN PATENT DOCUMENTS

| | | |
|---|---|---|
| 0582371 | 2/1994 | European Pat. Off. . |
| 0587105 | 3/1994 | European Pat. Off. . |
| 6-207118 | 7/1994 | Japan . |
| WO95/11512 | 4/1995 | WIPO . |

OTHER PUBLICATIONS

Copy of European Search Report.

*Primary Examiner*—Paul Lieberman
*Assistant Examiner*—Gregory R. Delcotto

[57] ABSTRACT

A product and process are disclosed that relate to electroconductive powders based on tantalum niobium, or phosphorus or any combination thereof doped tin oxide and coatings containing such powders. These powders can be used for making transparent coated films that are conductive and have desirable properties for a number of end uses. Some important end uses are in static dissipative fiber and films, coatings for recyclable containers, materials involved in packaging, where the presence of certain heavy metals is undesirable, transparent conductive coatings, among other uses.

8 Claims, 9 Drawing Sheets

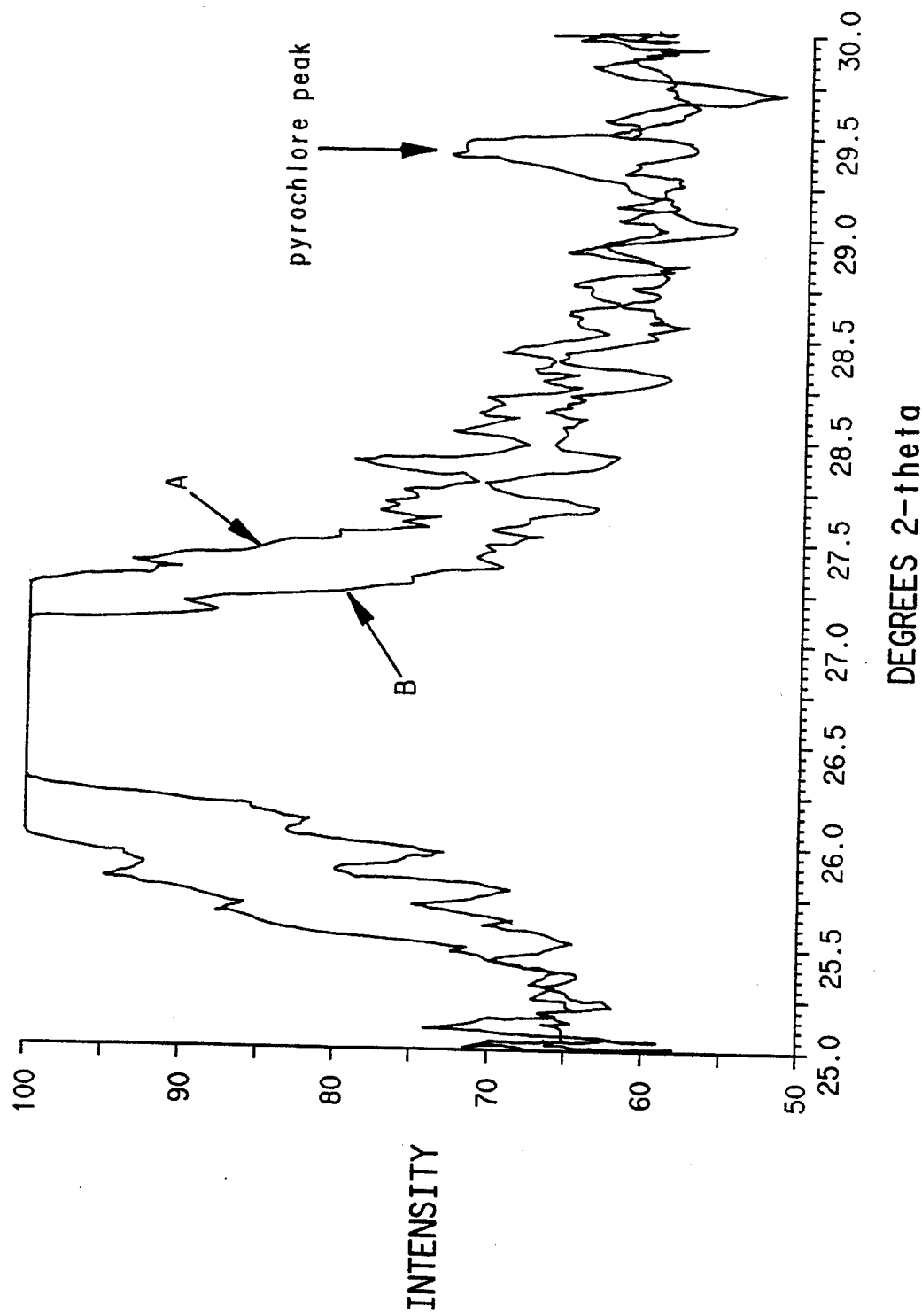

TIN OXIDE BASED CONDUCTIVE POWDERS AND COATINGS

This is a division of application Ser. No. 08/292,895, filed Aug. 18, 1994.

FIELD OF THE INVENTION

The present invention relates to novel electroconductive powders which are based on tin oxide that is doped with tantalum, niobium, or phosphorus or any combination thereof, and coatings containing such powders. These novel powders can be used for making transparent films that are conductive and have desirable properties for a number of end uses. Some end uses are in static dissipative fibers, coatings for recyclable containers, materials involved in packaging, e.g., where the presence of certain heavy metals is undesirable, among other uses.

BACKGROUND OF THE INVENTION

U.S. Pat. Nos. 5,071,676, 5,236,737, 4,373,013; 4,431,764; and 4,452,830 disclose compositions of antimony containing tin oxide electroconductive powders. These materials may be used in thin films such as polymer films, magnetic recording tapes, work surfaces and in paints to impart electroconductive properties.

U.S. Pat. Nos. 4,514,322, 4,548,741; 4,613,539; and 4,707,346 disclose compositions of tantalum and/or niobium doped tin oxide conductive materials based on a pyrochlore phase, e.g., $Sn(a)2+Ta(b)Nb(c)Sn(d)4+O(e)$ ($a=2-x$, $x=0-0.55$; b, $c=0-2$; $d=0-0.5$; $e=7-x-d/2$; $b+c+d=2$). These materials may be used to prepare thick film resistor compositions useful in a wide variety of electronic and light electrical components.

The disclosure of each of the previously identified patents is hereby incorporated by reference.

SUMMARY OF THE INVENTION

The present invention relates to compositions of electroconductive tin oxide powders comprising or consisting essentially of crystallites of tin oxide containing tantalum, niobium, and phosphorus or any combination thereof as dopants, and to conductive materials prepared with these powders.

The invention also relates to methods for preparing the powders and materials containing these powders. The process for preparing tantalum, niobium and phosphorus containing powders comprises precipitating the hydrous oxides from solutions, drying the precipitated hydrous oxides, and calcining the dried oxides to produce Ta and/or Nb and/or P doped tin oxides. An alternative process for preparing the phosphorus doped tin oxide comprises heating tin oxide while in the presence of a phosphorus source, e.g., phosphoric acid.

The electroconductive powders (ECPs) of the present invention, when formulated with appropriate binders and subjected to suitable milling procedures, can provide conductive films having a desirable transparency. Such coatings may be applied to a variety of surfaces to impart electrical conductivity and antistatic properties.

Antistatic properties are important when manufacturing electronic components or parts, such as computer chips, because these parts need to be protected from electrostatic discharge (ESD) during all steps of their fabrication, shipment, and assembly. This requires that all work surfaces and objects which come in contact with these electronic parts must be made electrically conductive to prevent build-up of electrostatic charges, i.e., electrostatic charge build-up and its subsequent rapid discharge can damage electronic pans. As a consequence, manufacturers of such parts employ electroconductive coatings for floors, walls, and furniture in the "clean rooms" where electronic parts are produced. Frequently, a light color is also desired for such coatings. In addition, plastic containers for shipping or transporting electronic pans need to have conductive coatings in order to prevent ESD damage of the pans during shipment. In many cases it is desirable that such containers be sufficiently transparent to allow visual inspection of the contents.

Another end use for ECPs and ECP containing coatings is in dielectric printing processes that employ a conductive transparent film or paper as a substrate. The powders of the present invention, which are substantially free from antimony, contain environmentally acceptable dopants that can be employed in coatings for recyclable containers and other materials, e.g., packaging. Thin films or coatings containing electroconductive powders can also be used within polymer films or fibers, magnetic recording tapes, on work surfaces and in paints to impart electroconductive properties, among many other uses.

With increasing emphasis on environmental considerations during recent years, there is a growing interest in using aqueous dispersion formulations to prepare conductive coatings. Typical practice in the paint and coatings industry is to use pigment to binder ratios of about 150:100 to about 50:100, and usually around 100:100. Substantially higher binder contents are typically not employed. When conventional aqueous-based coatings of electroconductive powders are prepared, the resultant coatings possess acceptable electrical conductivity for static dissipative purposes (surface resistivities less than about $10^{13}$ ohms/square); but, such coatings usually have poor transparency. The ECPs and coatings of the instant invention solve these problems.

The doped tin oxide compositions of the instant invention are distinct from powders that were prepared by known solid state synthesis, e.g., refer to U.S. Pat. Nos. 4,514,322, 4,548,741, 4,613,539 and 4,707,346. Solid state synthesis technology results in the formation of powder containing two phases one of which is known as pyrochlore. The ECP of the instant invention can be substantially pyrochlore free, e.g., pyrochlore free as determined by X-ray diffraction.

BRIEF DESCRIPTION OF THE DRAWINGS

FIG. 9—FIG. 9 is an X-ray diffraction pattern for Comparative Example 19.

In FIGS. 1–9, the x-axis corresponds to degrees 2-theta and the y-axis corresponds to intensity in counts per second.

Figure 1:
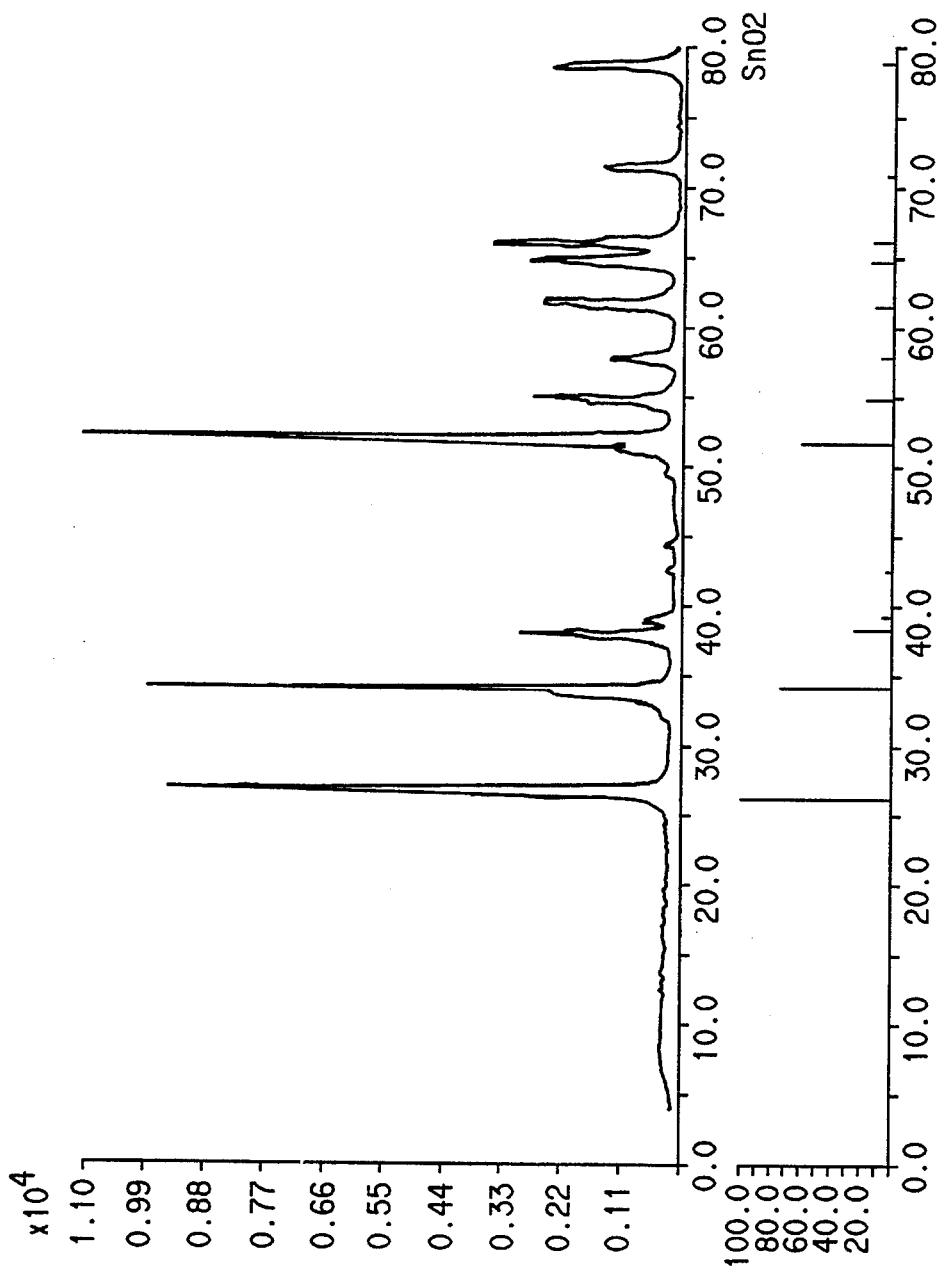
FIG. 1—FIG. 1 is an X-ray diffraction pattern for the powder produced in accordance with Example 1.

Pertinent reference patterns are presented below the sample patterns for comparison.

DETAILED DESCRIPTION

The electroconductive powders of the present invention can be prepared by a precipitation process in an aqueous media at a pH in the range of about 0 to 7. The precipitated solids can be recovered, washed with water, e.g., deionized water until substantially free from soluble species, and calcined to form electroconductive powders (ECPs). The precipitation process can produce a single crystalline phase of doped tin oxide that is distinct from conventional two crystalline phase materials, e.g., a mixture comprising tin oxide and pyrochlore.

By "doped tin oxide" or "Ta containing tin oxide" or "Nb containing tin oxide" or "P containing tin oxide", it is meant that a portion of the tin atoms within the tin oxide crystalline lattice have been replaced with at least one of Nb, Ta and P. The doped tin oxide may contain an amorphous phase. The doped tin oxide can be composed of fine crystallites that can become agglomerated to form particles.

The doped tip oxide of the invention can be substantially free of antimony and other undesirable heavy metals. By "substantially antimony free", it is meant that antimony containing compounds are not employed for making the inventive doped tin oxide thereby permitting the invention to achieve about 0 wt % antimony. While the presence of antimony does not adversely effect, for example, the conductivity of the instant powders, the presence of antimony can be undesirable for environmental reasons and its tendency to cause coloring. The doped tin oxide of the invention is, therefore, a marked improvement in the art by eliminating the problems associated with antimony containing compounds.

The doped tin oxide powder can also be substantially free of pyrochlore. By "substantially pyrochlore free", it is meant that the powder shows no pyrochlore lines as measured by conventional x-ray diffraction pattern analysis.

The compositions of the present invention comprise or consist essentially of tin oxide containing about 0.25 to 15 wt % on a metal oxide basis of at least one dopant selected from the group of Ta, Nb, and P; usually about 0.5–3.0 wt %. Normally, the X-ray diffraction patterns of these ECPs show substantially only the presence of a single phase comprising tin (IV) oxide. The ECP powders may also contain silica as an additive, e.g., about 0.1–10 wt % silica. Without wishing to be bound by any theory or explanation, it is believed that such additives can effectively reduce crystallite size.

Conductive coatings can be prepared from aqueous or non-aqueous ECP dispersions in organic binder systems. Coatings can be prepared that have a desirable combination of high transparency and electrical conductivity/resistivity, i.e., well within the static dissipative range.

The size of the ECP crystallites is an important characteristic when using the powders to cast transparent films. The smaller the crystallite size, the greater is the transparency of electroconductive films prepared from the powders of the invention. Surprisingly, the addition of phosphorus has been found to reduce the size of the crystallites as well as imparting conductivity to tin oxide. Optionally, silica may also be added to the tantalum or niobium compositions to reduce crystallite size; but silica is not believed to improve the conductivity of the inventive powders. Crystallite size was determined by peak broadening in the X-ray diffraction pattern. The crystallites range in size from about 40–500 Angstroms, normally about 40–100 Angstroms. The crystallites can form electroconductive powders or particles that ranges in size from about 0.05 to about 15 microns.

The dry powder electrical resistance is another important characteristic of the ECP composition. The electroconductivity of the powder is inversely related to the resistivity, and it is desirable that the dry powder electrical resistance be as low as possible so that the powder is most effective when incorporated into electroconductive coatings and films. A powder of the present invention is characterized by having a resistivity in the range of about 0.1–1000 ohm-cm, normally about 0.1–100 ohm-cm.

Electroconductive coatings can be prepared by dispersing the electroconductive powders of the present invention optionally along with other conventional electroconductive powders, with a variety of different binder materials,, solvents, co-solvents, pigment materials, among other materials. Such paint or coating formulations can be aqueous based or completely organic based. Suitable dispersion methods include agitator mixing, ball milling, sand milling, high-speed dispersers, media milling, among other methods. The dispersions can be coated onto a variety of substrates to give conductive coatings after the dispersion has dried. Suitable substrates include at least one of metal, glass, polyester, acrylic polymers, wood, among others.

Transparent conductive coatings can be prepared by casting aqueous or organic dispersions of electroconductive powders in an organic binder. Suitable organic binders include at least one of acrylic resins, polyester resins, gelatin; among others. Powder to binder ratios of about 2:1 to 1:4 provide a wide range of combinations of high electrical conductivity (low resistivity) and transparency.

Transparency of the electroconductive coatings of the present invention can be increased without substantially reducing the electrical conductivity by forming a "stratified" coating. In this aspect of the present invention, the electroconductive coating is overcoated with a relatively thin layer of an oil, a wax, polymer, or other suitable transparent material which can be applied in a relatively thin layer so it does not substantially reduce the conductivity of the coating.

The electroconductive coatings of the invention are typically about 0.0001 to about 0.009 inches in thickness. Surface resistivities are normally less than $10^{13}$ ohms per square.

Transparency is determined by the Image Recognition Test that involves making a visual assessment, or by measuring haze using a Hunter ColorQuest instrument. A haze value of less than 60% is required for the coatings to qualify as being transparent.

The electroconductive powders of the present invention can be prepared by precipitating metal oxides, e.g., hydrous metal oxides, from aqueous acidic solutions containing metal salts of tantalum, niobium, and tin, or the metal oxide in the case of phosphorus. The solution precipitation route to conductive powders in the present invention provides a fine crystallite size and, therefore, a fine particle size. The fine crystallize size also permits using a relatively low calcining temperature, and provides a more homogeneous powder.

A tantalum and/or niobium doped tin oxide electroconductive powder can be prepared by the controlled addition of tin and tantalum and/or niobium salt solutions, optionally while in the presence of a metal silicate, to an aqueous solution while maintaining the pH at 0 to 7 with a basic solution thereby causing hydrous tin oxide which contains hydrous tantalum and/or niobium oxide to precipitate. The basic solution may comprise at least one of sodium hydroxide, potassium hydroxide, ammonium hydroxide, among others. The metal salts may be at least one of chlorides, sulfates, nitrates, oxalates, acetates among other suitable water soluble metal salts. A phosphorus containing tin oxide can be prepared by using a suitable phosphorus precursor or source. The phosphorus source may comprise phosphoric acid or other water soluble phosphorus compounds including at least one of phosphorus pentoxide, phosphorous pentachloride, phosphorus oxychloride, among others.

In one aspect of the invention, a tantalum and/or niobium and/or phosphorus containing tin oxide electroconductive powder can be prepared by a process comprising:

(1) preparing solutions comprising tantalum, niobium and/or phosphorus and a tin solution.

(2) mixing the tantalum, niobium and/or phosphorus solutions with the tin solution.

(3) adding solution (2) to water at 25 to 100 degrees C. while maintaining pH at about 0 to 7 with sodium hydroxide solution and stirring the mixture thereby precipitating a product.

In another aspect of the invention, a phosphorus doped tin oxide electroconductive powder of the invention can be prepared by a process comprising:

(1) preparing an aqueous tin salt solution and a phosphorus pentoxide acid solution, e.g., phosphorus pentoxide dissolved in concentrated HCl, followed by mixing the two solutions.

(2) adding solution (1) to water at 25 to 100 degrees C. while stirring and maintaining pH 0 to 7 with sodium hydroxide, thereby precipitating a product.

The product comprises hydrous metal oxides which are recovered by filtration, washed until they are substantially free from chloride ion or other soluble species and then dried. The dried powders can be calcined in an substantially inert atmosphere, which typically contains less than about 25 volume % air such that the oxygen concentration is minimized, to form particles comprising agglomerated electroconductive crystallites of tin oxide containing tantalum and/or niobium and/or phosphorus. The inert atmosphere may comprise one or more of nitrogen, argon, helium, among other nonoxidizing atmospheres.

The source of tin in the process of the invention can comprise at least one of tetravalent tin salts, e.g., $SnCl_4 \cdot 5H_2O$, sulfate, nitrate, oxalate, acetate, among other suitable water soluble salts. Salt solutions can be prepared in deionized water or dilute acid, e.g., 1M HCl. While the concentration of the tin salt is not critical, the concentration is usually about 50–500 grams of tin as $SnO_2$ per liter.

In the process of the invention, the precipitated tin oxide may be doped with tantalum, niobium, phosphorus, or any combination thereof. Tantalum and/or niobium doped powders salt solutions can be prepared in concentrated acid, e.g., 2–6M HCl. It is convenient to use the chloride salts of these metals, however, other water soluble salts may be used. The concentration of the tantalum and/or niobium salt solution normally is in the range of about 0.01 to 0.5M. For phosphorus, an aqueous acidic solution comprising phosphorus oxide species, such as phosphorus pentoxide can be prepared in a concentrated acid, e.g., 1–3M HCl. It is normally desirable to use a sufficient quantity of acid to ensure that the metal salt or phosphorus source is dissolved, but is not prematurely hydrolyzed.

Typically hydrochloric acid is used for preparing the dopant containing solutions. In some cases, one or more of sulfuric and nitric acid may also be used.

The process can be performed in an acidic aqueous solution, with pH in the range of about 0 to 7, usually, about 1 to 3. If desired, the process can be performed in any suitable medium or solution.

In an optional step, a solution comprising an alkali silicate in distilled water is prepared. Sodium silicate or potassium silicate are most commonly used and preferred due to their availability and economy. The alkali silicate is added to the NaOH solution in an amount equal to from about 0.1 to 10 wt %. Without wishing to be bound by any theory or explanation, it is believed that the silicate can be used to reduce crystallite size of the doped tin oxide powder. Using silica to reduce the average crystallite size is discussed in greater detail in U.S. patent application Ser. No. 08/218,874, filed on Mar. 25, 1994 that is a continuation of Ser. No. 07/905,980, filed on Jun. 29, 1992 (which corresponds to PCT Publication No. WO94/00852); the disclosure of which is hereby incorporated by reference.

The solutions of the various components to be mixed together to form the electroconductive powders may be combined prior to being added to water, e.g., distilled water, or the solutions may be simultaneously added to the water. The solutions can be mixed by being continuously agitated while maintaining the pH in the range of 0 to 7, normally 1 to 3, by the controlled addition of an aqueous basic solution, e.g., a sodium hydroxide solution. The solutions can be mixed at a temperature between 25 and 100 degrees C., usually between 60 and 90 degrees C. The solution or solutions can be added to the water over a period of time less than one minute up to several hours thereby forming a suspension. The resulting suspension is usually cured by continuous agitation for up to one hour, typically, one half hour, at a pH between about 0 to 7, e.g., about 1 to 3, and at a temperature between 25 and 100 degrees C., e.g., between about 60 and 90 degrees C.

The solids can be recovered from the suspension by filtration, for example, by vacuum filtration, and can be washed with deionized water until the wash is substantially free of chloride or other soluble ions, e.g., as determined by conductivity of the filtrate or by chloride test strips. The washed solids contain hydrous metal oxides that can be dried at a temperature of about 120 to 150 degrees C., usually in an air oven.

The dried solids can be calcined in an inert atmosphere, for example, nitrogen, at a temperature in the range of 500–900 degrees C. for about 10 minutes to 10 hours, and cooled to room temperature within the inert atmosphere.

Electroconductive powders prepared by the process of the present invention are evaluated by determining the electrical resistance of the dry powder. A relative comparison of dry powder samples is possible provided the particle size and shape does not vary substantially among the samples. Generally, the lower the relative resistance of the dry powder, the higher the conductance in an end-use application. However, many other factors, such as the ability to form an interconnecting network in the end-use carrier matrix or binder system, may also affect end-use conductance.

The resistivity of the dry powder is determined by a powder resistance test. The powder resistance test is performed with a cylindrical cell and a Carver laboratory press as detailed in U.S. Pat. No. 5,236,737; the disclosure of which is hereby incorporated by reference. The cell is constructed with brass electrodes at the top and bottom, that fit snugly inside a cylindrical piece of plastic having an inner diameter of about 3 centimeters. Copper leads attached to the brass electrodes are connected to an ohm meter. With the bottom electrode in position, a sample of electroconductive powder is introduced into the plastic cylinder and the top electrode is placed in position above the powder. The height of the powder should be about 2.0 cm before any pressure is exerted on it. Using a Carver laboratory press, the powder sample is compressed between the upper face of the bottom electrode and the lower face of the top electrode. The height and electrical resistance of the powder are then measured, the latter with an ohm meter. The measurement of the height and resistance are repeated at compressions, respectively, of 250, 1000, 2000, 4000, 6000, 8000, and 10.000 psi.

The value of the powder resistance at the compression used is obtained by the following equation:

Resistivity, $r = (Resistance \times Area)/Height$

Resistance is measured in ohms. Area is the area of the cylinder cross-section in square centimeters. Height is the length of the powder column between the top and bottom electrodes in centimeters. The ECP of the invention can have a resistivity of from about 0.1 to about 1000 ohm-cm.

The efficiency of the inventive composition for imparting electroconductive properties to a coating is determined by dispersing the powder into an aqueous or organic matrix, casting a coating on a substrate, drying and measuring the surface resistivity.

The electroconductive coatings of the present invention can be prepared by dispersing finely ground, calcined tantalum, niobium and/or phosphorus containing tin oxide electroconductive powder of the invention, i.e., the ECP function as a conductive filer or pigment, within a carrier comprising at least one of an aqueous based paint dispersion, all-organic polyester dispersion, among others. A drawdown or coating of the dispersion is made on a substrate that can be, for example, a glass plate or a polyester film and the coating is allowed to dry thereby forming the electroconductive coating.

If desired, opaque conductive coatings can be prepared by using a finely ground ECP of the present invention as a pigment for preparing paint dispersions. Such paint dispersions can be coated and dried onto a variety of substrates thereby forming conductive coatings. A variety of different binder materials, solvents, co-solvents, and other pigment materials may be mixed with the powders of this invention to give conductive coatings. Examples of such materials and solvents can be found in "Paint and Surface Coatings", editor, R. Lambourne, John Wiley & Sons, 1987; the disclosure of which is hereby incorporated by reference. Such paint or coating formulations may be aqueous based, or completely organic based. A variety of dispersion methods may be used such as simple agitator mixing, ball milling, sand milling, high-speed dispersers, among other suitable media milling methods.

Transparent conductive coatings can be prepared from aqueous or non-aqueous dispersions of electroconductive powders within organic binder systems. It has been discovered in this invention that such coatings can be produced by using unusually large quantities of binders and intensive dispersion preparation techniques. Pigment to binder ratios (P/B) in the range of P/B=2:1 to P:B=1:4 were found to achieve a variety of desirable combinations of transparency and electrical conductivity/resistivity, e.g., within the static dissipative range. In addition, when using the substantially antimony-free powders of this invention, or optionally in combination with known electroconductive powders, light-colored transparent conductive coatings can be obtained. Examples are provided hereinafter which illustrate the surprising discovery that transparency without loss of electrical conductivity can be obtained at these high binder concentrations.

Transparency of the ECP coating can be measured visually either by the Image Recognition Test (IRT) or as a percent Haze, by using a Hunter ColorQuest instrument (supplied by Hunter Assoc. Lab, Inc.). This instrument also provides measurements of distance from whiteness (L, a, b scale).

Increased transparency of the coatings of this invention can be achieved after the coatings have been made, without substantially reducing the electrical conductivity of the coatings. It has been discovered that substantial increases in transparency (reduction of haze) can be achieved in the coatings of this invention by producing a "stratified" coating. Such stratified, highly transparent coatings are prepared by overcoating the transparent conductive coating with a relatively thin layer of an oil, wax, polymer, among other suitable transparent material. The stratified coating can be applied in a thin enough layer so it does not substantially reduce the conductivity of the coating.

The coatings of the present invention can be characterized by their resistivity or conductivity. The surface resistivity of the coating is measured using a Dr. Thiedig Milli-to-2 current/resistance meter (Monroe Electronics, Lyndonville, N.Y.). This instrument gives a direct reading in conventional units, ohms per square. The lower the value for surface resistivity, the higher the electroconductivity. The surface resistivities of the coatings of the invention can be tailored to suit the needs of the applications and are typically less than $10^{13}$ ohms per square.

Transparency of the electroconductive coatings of the invention can be measured by the Image Recognition Test (IRT) as follows. The eight digit serial number on a U.S. one dollar bill (next to the picture of George Washington) is viewed through the coated sample sheet under typical office lighting conditions. The maximum distance (between coated sample sheet and the dollar bill) at which the serial number can still be recognized and read correctly is a measure of the "Image Recognition Transparency" of the coating. This method has practical relevance because many end uses for transparent conductive coatings involve recognizing parts or symbols through a conductively coated "see-through" plastic package.

Transparency can also be determined by haze measurements. Haze is a measure of the percent of light that is scattered as the light passes through a sample mounted in a Hunter ColorQuest instrument. The lower the haze value, the less light is scattered and the higher is the degree of transparency and clarity. The ECP of the invention can be used for making a conductive coating that has a haze of less than about 10%.

The Hunter instrument also provides measurements of distance from whiteness (L, a, b scale). A conventional CIELab scale is used with a (D65) illuminant, at a 2 degree observer angle. The sample is placed into a standard powder cell with a glass window. Numerical values are generated for $L^*$, $a^*$, and $b^*$, which define the lightness and color in three coordinates. $L^*$ refers to the lightness or darkness of the sample, with 100 being very light and zero being very dark. The $a^*$ and $b^*$ values contain chroma information. A positive value for $a^*$ corresponds to red, while a negative value indicates the presence of green. A positive value for $b^*$ corresponds to yellow, while a negative value indicates the presence of blue. The $L^*$, $a^*$ and $b^*$ values are used to calculate a vector sum to report color as a "distance from whiteness". The $L^*$ value is subtracted from 100, and this number is squared then added to the squares of the $a^*$ and $b^*$ values. The square root of this sum is taken and this value is subtracted from 100. The final number is the "distance from whiteness", with true white being 100. The ECP of the invention typically has a distance from whiteness of less than about 20.

While the process described above places emphasis upon employing an aqueous solution for precipitating hydrous tin oxide, it is to be understood that other solution systems can be used, e.g., solvent based systems containing a suitable alcohol, among others. In this regard, a key aspect of the process of the present invention is that reactants are soluble in the reaction medium or system wherein they can be brought together intimately under conditions in which they react to form hydroxides which are in turn converted into an oxide.

The electroconductive material of the present invention and its method of preparation are illustrated in more detail in the examples which should not be construed as limiting in any way the scope of the invention. Unless stated to the contrary, composition is on a weight percentage basis. Examples 1–11 illustrate methods for making the doped tin oxide powder of the invention, and Examples 12–18 illustrate methods for making conductive coatings that can incorporate the doped tin oxide powders of the invention.

EXAMPLE 1

Approximately 2000 ml of distilled water was heated to about 90 degrees C. Aqueous solutions of $SnCl_4$ (available from Mason Metals & Chemical Co., Schererville, Ind.; 450 ml of a solution containing 0.445 g $SnO_2$/ml) and $TaCl_5$ (available from Aldrich, Milwaukee, Wis.; 240 ml of a solution containing 0.019M $TaCl_5$ in concentrated HCl) were added to the water under constant agitation over the course of approximately one hour. The pH was maintained at about 2.0 by using 20% aqueous NaOH solution. After the addition of the $SnCl_4$ and $TaCl_5$ solutions, the resulting slurry was stirred at about 90 degrees C. for approximately 15 minutes.

The solid product was recovered by vacuum filtration, washed with distilled water until substantially free from chloride and dried in a oven at about 120 degrees C. in air. The dried powder was calcined in a furnace having a nitrogen atmosphere at about 800 degrees C. for approximately 6 hours.

The product contained about 0.5% $Ta_2O_5$ as determined by X-ray fluorescence spectrometry. X-ray fluorescence spectrometry is an elemental analysis which records the presence of tantalum in an oxide format, i.e., as tantalum oxide. X-ray diffraction pattern analysis records substantially only the presence of tin oxide.

The dry powder resistivity was about 4.10 ohm-cm as determined by the aforementioned powder resistance test described in U.S. Pat. No. 5,236,737.

The product was examined by X-ray diffraction which indicated that the average crystallite size was about 398 Angstroms. Average crystallite size was measured by the general X-ray diffraction techniques described by Klug and Alexander, "X-ray Diffraction Procedures" John Wiley and Sons, 1974, pp. 687–704 the disclosure of which is hereby incorporated by reference. The measurements were made with a Philips Automated Powder Diffractometer, model PW-1710. The apparatus is equipped with a Cu target line focus tube, a graphite monochromator, a stepping motor on the goniometer, a theta compensating slit system, a scintillation detector, and an XRG-3000 generator. Instrument settings and conditions for normal data collection runs are 45 kV, 40 mA, count time=3 seconds, step size=0.03 degrees 2-theta, receiving slit=0.2 mm, and scan range=4.0 to 80.0 degrees 2-theta. The data are collected, and a Microvax II is used to run Philips software in which smoothing and peak search routines locate the peaks and convert 2-theta values to d-spacings. The maximum crystallite size that could be measured using the equipment described herein was about 2500 Angstroms.

FIG. 1 is an X-ray diffraction pattern that was generated for the powder produced in accordance with Example 1.

EXAMPLE 2

Approximately 1500 ml of distilled water was heated to about 90 degrees C. Aqueous solutions of $SnCl_4$ (450 ml of a solution containing 0.445 g $SnO_2$/ml), $TaCl_5$ (490 ml of a concentrated HCl solution containing 0.038M $TaCl_5$) and $K_2SiO_3$ (6.0 g of $K_2SiO_3$, PQ Corp. #6, diluted to 200 ml with distilled water) were prepared. Under constant agitation, the $SnCl_4$, $TaCl_5$ and $K_2SiO_3$ solutions were added to the distilled water over the course of approximately 2 hours. The pH was maintained at about 2.0 by the addition of a 20% aqueous NaOH solution. After addition of the $SnCl_4$, $TaCl_5$, and $K_2SiO_3$ solutions, the mixture was stirred at 90 degrees C. for approximately 15 minutes.

A solid product was recovered by filtration, washed with distilled water until substantially free from chloride and dried at 120 degrees C. in air. The dried powder was calcined in nitrogen at about 800 degrees C. for approximately 6 hours.

The product contained 2% $Ta_2O_5$ as determined by X-ray fluorescence spectrometry. The dry powder resistivity was about 5.10 ohm-cm with an average crystallite size of approximately 120 Angstroms.

Figure 2:
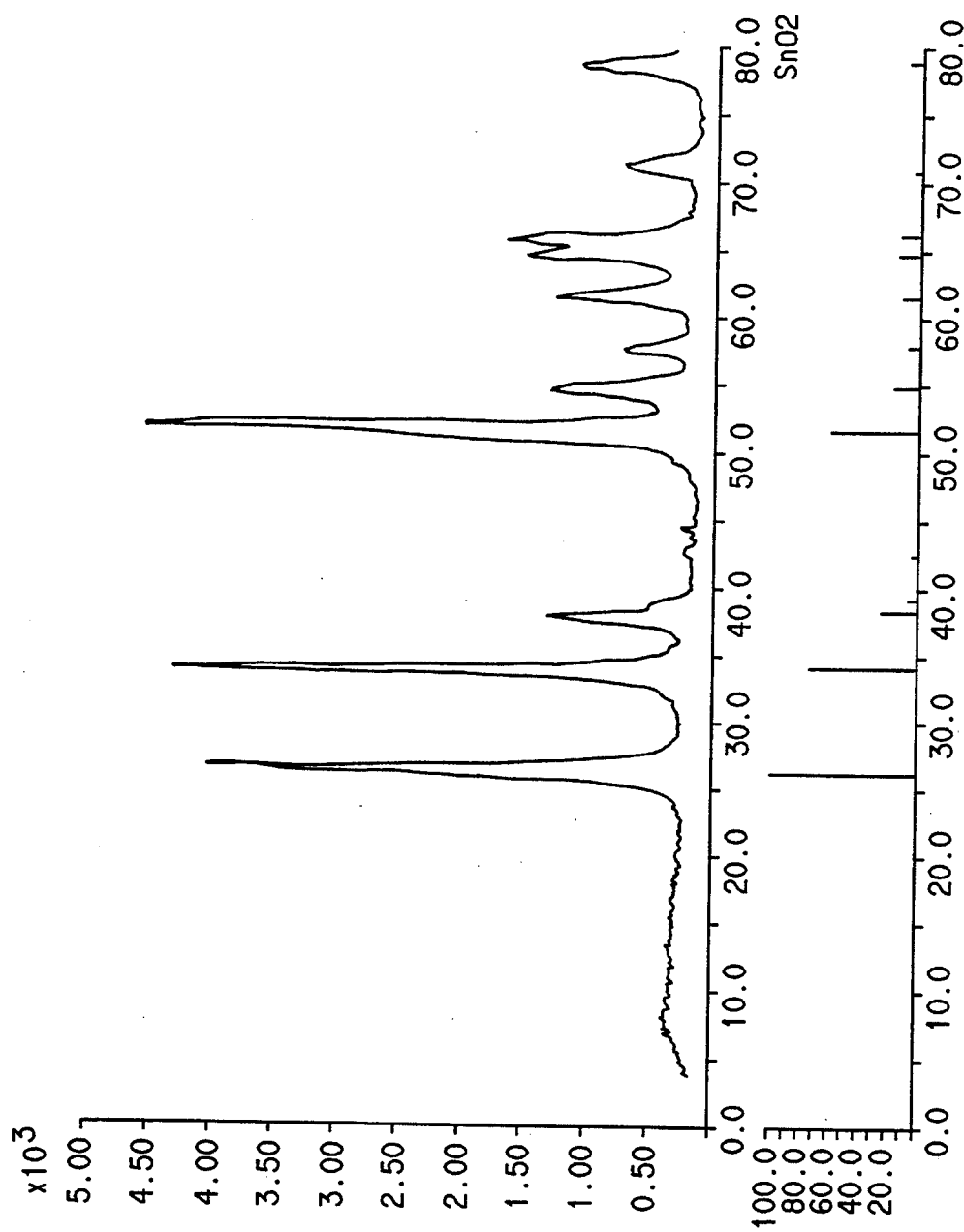
FIG. 2—FIG. 2 is an X-ray diffraction pattern for the powder produced in accordance with Example 2.

FIG. 2 is an X-ray diffraction pattern that was generated for the powder produced in accordance with Example 2.

The surface area of the product was 14.4 $m^2/g$. Specific surface area (in square meters per gram) of the electroconductive powders was determined from nitrogen adsorption measurements in accordance with the general method of Brunauer, Emmett, and Teller (BET). The measurements were made with a Model 2100 Surface Area and Pore Volume Analyzer sold by Micromeritics Instruments Corp.

EXAMPLE 3

Approximately 200 ml of distilled water was heated to about 80 degrees C. Aqueous solutions of $SnCl_4$ (40.5 ml of a solution containing 0.445 g $SnO_2$/ml) and $TaCl_5$ (48.6 ml of a solution containing 0.19M $TaCl_5$ in concentrated HCl) were added simultaneously to the water under constant agitation over the course of approximately one hour. The pH was maintained at about 2.0 using 20% aqueous NaOH solution. After the adding the $SnCl_4$ and $TaCl_5$ solutions the resulting slurry was stirred at about 80 degrees C. for approximately 15 minutes.

A solid product was recovered from the slurry by vacuum filtration, washed with distilled water until substantially free from chloride and dried in an oven at a temperature of about 120 degrees C. in air. The dried powder was calcined in nitrogen at about 800 degrees C. for approximately 6 hours.

The calcined product contained about 8.6% $Ta_2O_5$ as determined by X-ray fluorescence spectrometry.

The dry powder resistivity of the calcined product was greater than 10.000 ohm-cm.

EXAMPLE 4

Approximately 200 ml of distilled water was heated to about 80 degrees C. A solution of $SnCl_4 \cdot 5H_2O$, 44 ml of a solution containing about 0.445 g $SnO_2$/ml was prepared. A solution of $NbCl_5$ (available from Aldrich, Milwaukee, Wis.), 16 ml, containing 0.19M $NbCl_5$ in concentrated HCl was prepared. Under constant agitation, the Sn and Nb solutions were simultaneously added to the heated distilled water over the course of approximately 1 hour, while maintaining pH at about 2.0 with an aqueous solution of 20% NaOH. After adding the $SnCl_4$ and $NbCl_5$ solutions, the resulting slurry was stirred at about 80 degrees C. for approximately 15 minutes.

The solid product was recovered from the slurry by vacuum filtration, washed with distilled water until substantially free from chloride and dried in an oven at a temperature of about 120 degrees C. in air. The dried powder was calcined in nitrogen at about 800 degrees C. for approximately 6 hours.

The calcined product contained 2% $Nb_2O_5$ as determined by X-ray fluorescence spectrometry. The dry powder resistivity of the calcined product was 38 ohm-cm.

EXAMPLE 5

Approximately 4000 ml of distilled water was heated to about 80 degrees C. A solution of $SnCl_4 \cdot 5H_2O$ in approximately 2000 ml of distilled water, 0.445 g $SnO_2$/ml, was prepared. About 15 g of $P_2O_5$ was dissolved into 250 ml of concentrated HCl, then an additional 125 ml of concentrated HCl was added. Approximately 500 ml of concentrated HCl was then added to the $SnCl_4$ solution. The $SnCl_4$ and $P_2O_5$ solutions were mixed together in a beaker.

Under constant agitation, the $SnCl_4/P_2O_5$ solution was added to the 4000 ml of heated distilled water over the course of about 3.5 hours, while maintaining pH at about 2 with 30% aqueous NaOH solution. After the addition was completed, the resulting mixture was stirred at about 80 degrees C. for approximately 30 minutes.

The solid product was recovered from the mixture by vacuum filtration, washed with distilled water until substantially free from chloride, and dried in an oven at a temperature of about 120 degrees C. in air. The dried powder was rotary calcined in nitrogen at about 800 degrees C. for approximately 2 hours.

The calcined product was comprised of about 1.5% $P_2O_5$ doped tin oxide as determined by X-ray fluorescence spectrometry. The dry powder resistivity of the calcined product was about 26.2 ohm-cm after hammermilling. The calcined product had an average crystallite size of about 106 Angstrom.

Figure 3:
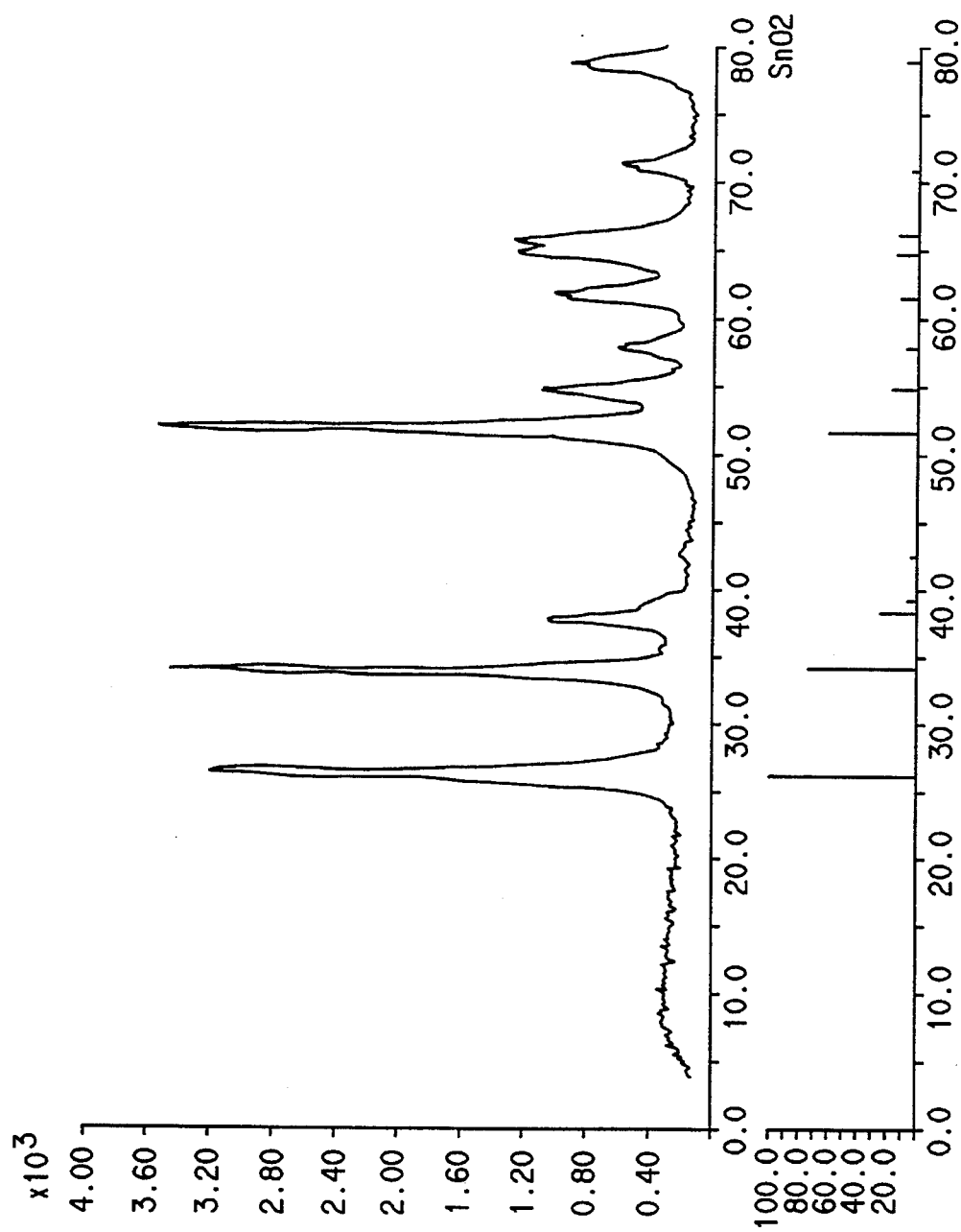
FIG. 3—FIG. 3 is an X-ray diffraction pattern for the powder produced in accordance with Example 5.

FIG. 3 is an X-ray diffraction pattern that was generated for the powder produced in accordance with Example 5.

EXAMPLE 6

Approximately 4000 ml of distilled water was heated to about 80 degrees C. A solution of $SnCl_4 \cdot 5H_2O$ in 2000 ml of distilled water, about 0.445 g $SnO_2$/ml was prepared. Approximately 30 g of $P_2O_5$ was dissolved into 250 ml of concentrated HCl, then an additional 125 ml of HCl was added. Approximately 500 ml of concentrated HCl was then added to the $SnCl_4$ solution. The $SnCl_4$ and $P_2O_5$ solutions were mixed together in a beaker.

Under constant agitation, the $SnCl_4/P_2O_5$ solution was added to the 4000 ml of distilled water over the course of approximately 3.5 hours, while maintaining pH at about 2 with 30% aqueous NaOH solution. After the addition was completed, the resulting mixture was stirred at about 80 degrees C. for approximately 30 minutes.

The solid product was recovered from the mixture by vacuum filtration, washed with distilled water until substantially free from chloride and dried in an oven at a temperature of about 120 degrees C. in air. The dried powder was rotary calcined in nitrogen at about 800 degrees C. for approximately 2 hours.

The calcined product was comprised of 3.3% $P_2O_5$ as determined by X-ray fluorescence spectrometry. The dry powder resistivity of the calcined product was about 9.8 ohm-cm. The average crystallite size of the calcined product was about 88 Angstroms.

Figure 4:
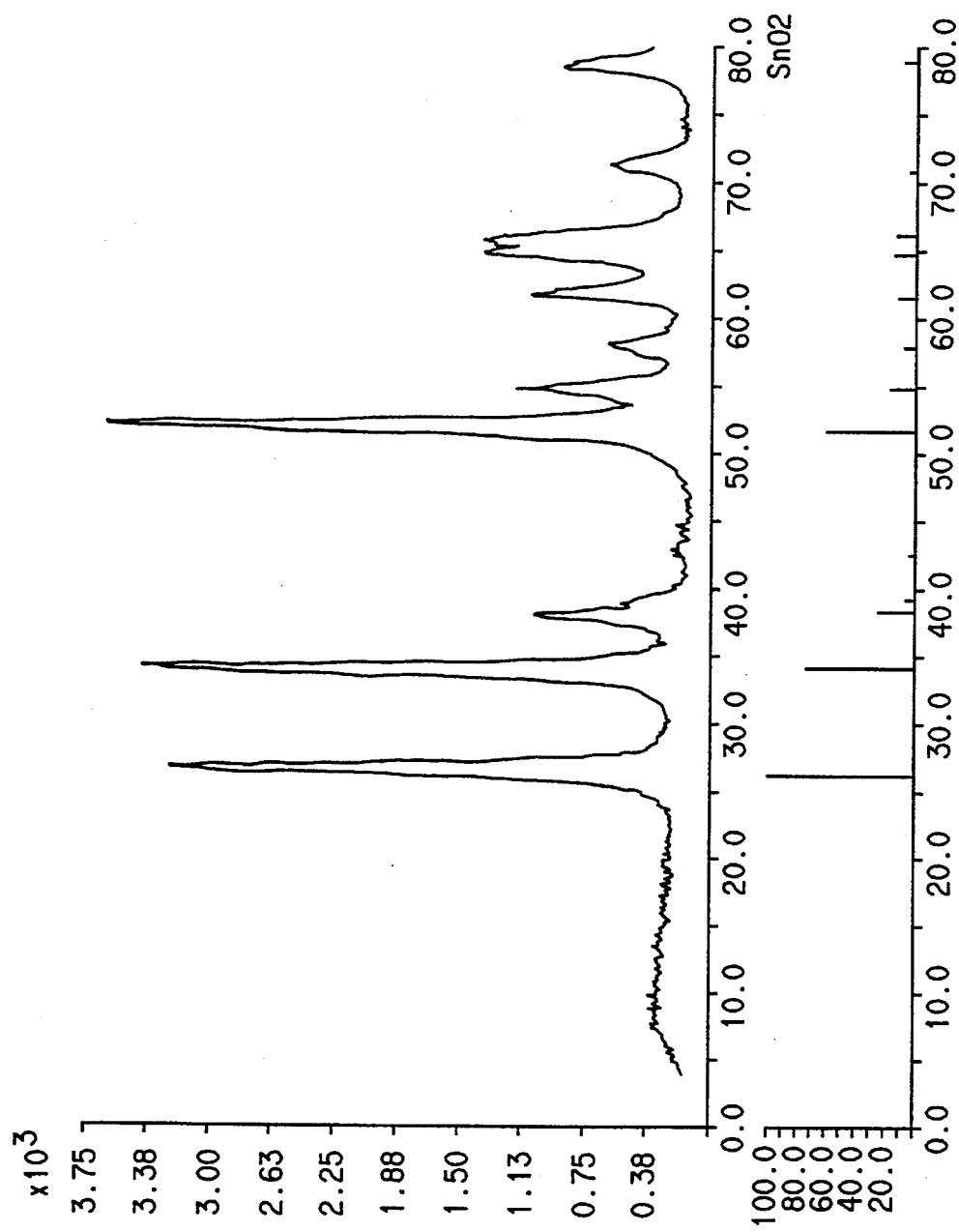
FIG. 4—FIG. 4 is an X-ray diffraction pattern for the powder produced in accordance with Example 6.

FIG. 4 is an X-ray diffraction pattern that was generated for the powder produced in accordance with Example 6.

EXAMPLE 7

Approximately 2000 ml of distilled water was heated to about 80 degrees C. A solution of $SnCl_4 \cdot 5H_2O$ in 500 ml of distilled water, 0.445 g $SnO_2$/ml was prepared. Approximately 52.5 g of $P_2O_5$ was dissolved in 440 ml of concentrated HCl, then an additional 217 ml of HCl was added. About 500 ml of concentrated HCl was added to the $SnCl_4$ solution. The $SnCl_4$ and $P_2O_5$ solutions were mixed together in a beaker.

Under constant agitation, the $SnCl_4/P_2O_5$ solution was added to the 2000 ml of distilled water over the course of approximately 1.5 hours, while maintaining pH at about 2 with 20% aqueous NaOH solution. After addition was completed, the resulting mixture was stirred at about 80 degrees C. for approximately 30 minutes.

The solid product was recovered from the mixture by vacuum filtration, washed with distilled water until substantially free from chloride and dried in an oven at a temperature of about 120 degrees C. in air. The dried powder was rotary calcined in nitrogen at about 800 degrees C. for approximately 2 hours.

The calcined product contained 16% $P_2O_5$ as determined by X-ray fluorescence spectrometry. The dry powder resistivity of the calcined product was about 4.8 Mohm-cm. The calcined product had an average crystallite size of 48 Angstrom.

Figure 5:
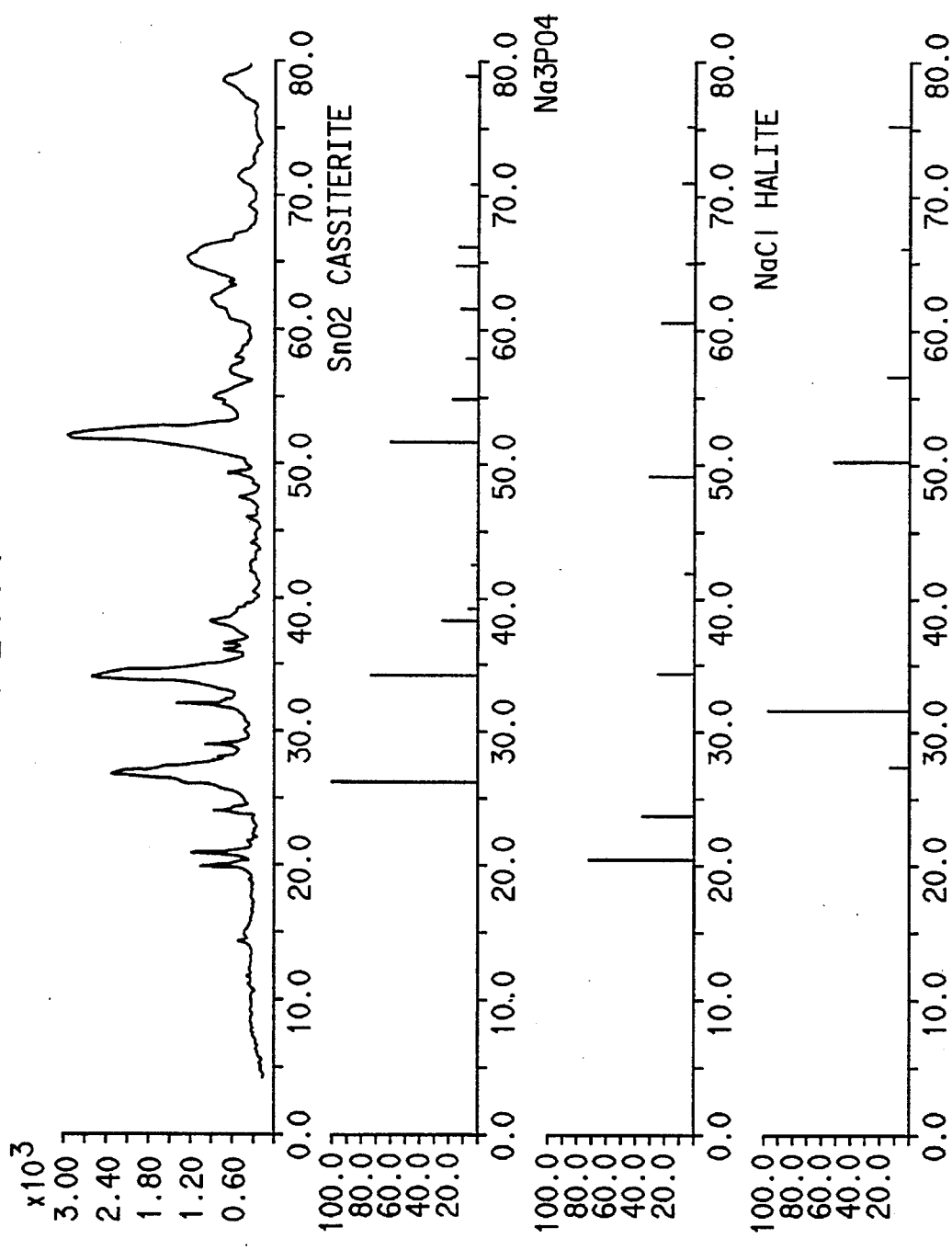
FIG. 5—FIG. 5 is an X-ray diffraction pattern for the powder produced in accordance with Example 7.

FIG. 5 is an X-ray diffraction pattern that was generated for the powder produced in accordance with Example 7. FIG. 5 illustrates that the presence of two phases can adversely effect the dry powder resistivity.

EXAMPLE 8

Approximately 6500 ml of distilled water was heated to about 80 degrees C. Approximately 30 g of $P_2O_5$ was dissolved in 250 ml of concentrated HCl, then an additional 125 ml of HCl was added. A solution of $SnCl_4 \cdot 5H_2O$ in 2000 ml of distilled water was prepared which contained about 0.445 g $SnO_2$/ml. A solution of $TaCl_5$ in concentrated HCl was prepared which contained about 0.19M $TaCl_5$. The $TaCl_5$, $SnCl_4$ and $P_2O_5$ solutions were mixed together in a beaker.

Under constant agitation, the $SnCl_4/TaCl_5/P_2O_5$ solution was added to the 6500 ml of distilled water over the course of approximately 3.5–4 hours, while maintaining pH at about 2–3 with 20% aqueous NaOH solution. After addition was completed, the resulting mixture was stirred at about 80 degrees C. for approximately 30 minutes.

A solid product was recovered from the mixture by vacuum filtration, washed with distilled water until substantially free from chloride and dried in an oven at a temperature of about 120 degrees C. in air. The dried powder was calcined in nitrogen at about 800 degrees C. for approximately 6 hours.

The calcined product contained 3% $Ta_2O_5$ and 3% $P_2O_5$ as determined by X-ray fluorescence spectrometry. The dry powder resistivity of the calcined product was about 193 ohm-cm and had an average crystallite size of about 94 Angstroms.

Figure 6:
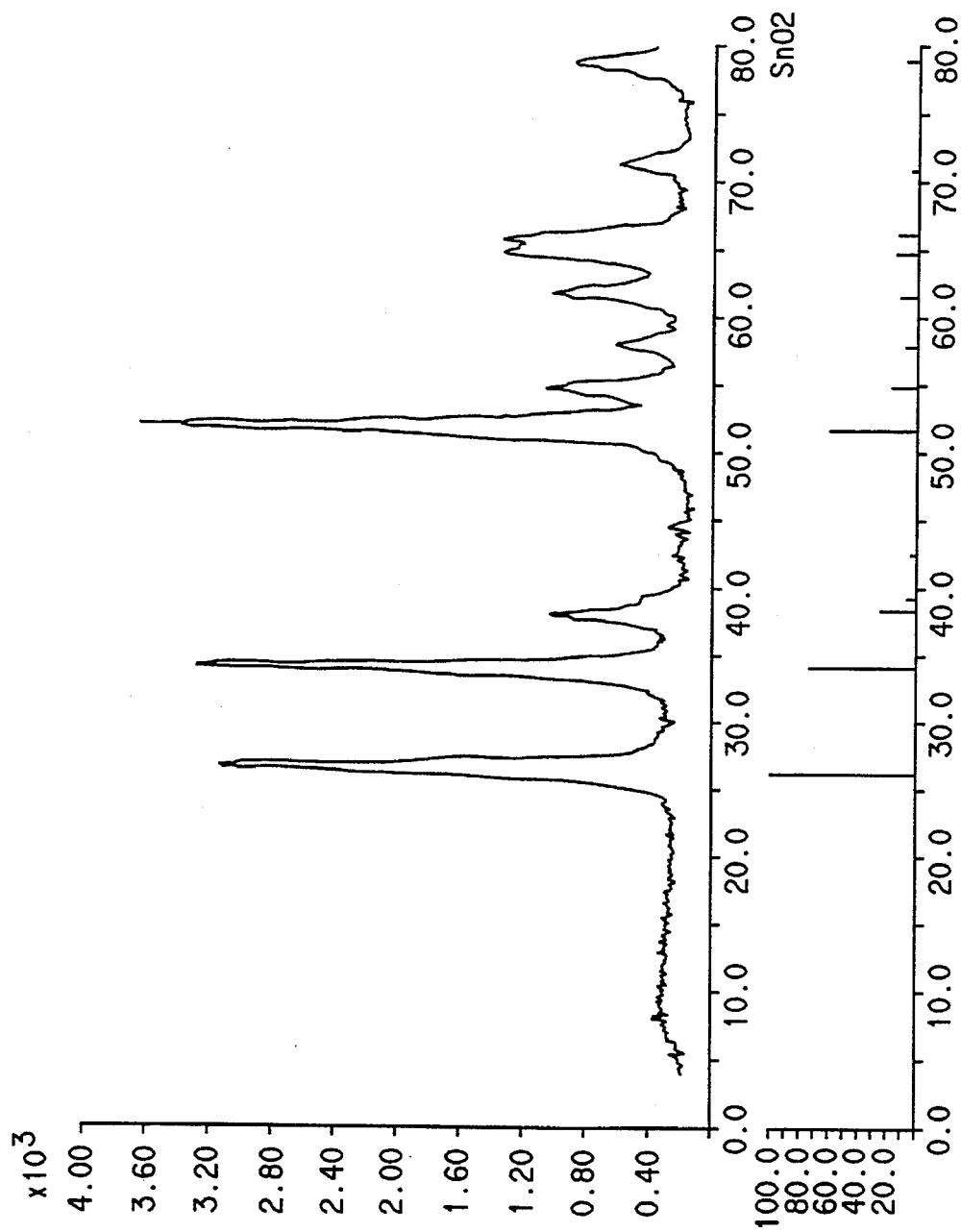
FIG. 6—FIG. 6 is an X-ray diffraction pattern for the powder produced in accordance with Example 8.

FIG. 6 is an X-ray diffraction pattern that was generated for the powder produced in accordance with Example 8.

EXAMPLE 9

Approximately 2000 ml of distilled water was heated to about 90 degrees C. Aqueous solutions of $SnCl_4$ (432 ml of a solution containing 0.445 g $SnO_2$/ml) and $TaCl_5$ (24 ml of a solution containing 0.19M $TaCl_5$ in concentrated HCl) were added to the heated water while under constant agitation over the course of approximately one hour. The pH was maintained at about 7 by using 20% aqueous NaOH solution. After adding the $SnCl_4$ and $TaCl_5$ solutions, the resulting slurry was stirred at about 90 degrees C. for approximately 15 minutes.

A solid product was recovered from the slurry by vacuum filtration, washed with distilled water until substantially free from chloride and dried in an oven at a temperature of about 120 degrees C. in air. The dried powder was calcined in nitrogen at about 800 degrees C. for approximately 6 hours.

The calcined product contained 0.4% $Ta_2O_5$ as determined by X-ray fluorescence spectrometry. The dry powder resistivity of the calcined product was about 15 Mohm-cm. The crystallite size of the calcined product was on average about 121 Angstroms.

EXAMPLE 10

Approximately 2000 ml of distilled water was heated to about 80 degrees C. A solution of $SnCl_4 \cdot 5H_2O$ in 500 ml of distilled water, 0.445 g $SnO_2$/ml was prepared. Approximately 7.5 g of $P_2O_5$ was dissolved in 63 ml of concentrated HCl, then an additional 31 ml of HCl was added. About 125 ml of concentrated HCl was added to the $SnCl_4$ solution. The $SnCl_4$ and $P_2O_5$ solutions were mixed together in a beaker.

Under constant agitation, the $SnCl_4$/$P_2O_5$ solution was added to the 2000 ml of distilled water over the course of approximately 3.5 hours, while maintaining pH at about 7 with 30% aqueous NaOH solution. After addition was completed, the resulting mixture was stirred at about 80 degrees C. for approximately 30 minutes.

A solid product was recovered from the mixture by vacuum filtration, washed with distilled water until substantially free from chloride and dried in an oven at a temperature of about 120 degrees C. in air. The dried powder was rotary calcined in nitrogen at about 800 degrees C. for approximately 2 hours.

The calcined product contained 2% $P_2O_5$ as determined by X-ray fluorescence spectrometry. The dry powder resistivity of the calcined produce was about 7 Mohm-cm. The calcined product had an average crystallite size of about 81 Angstroms.

Figure 7:
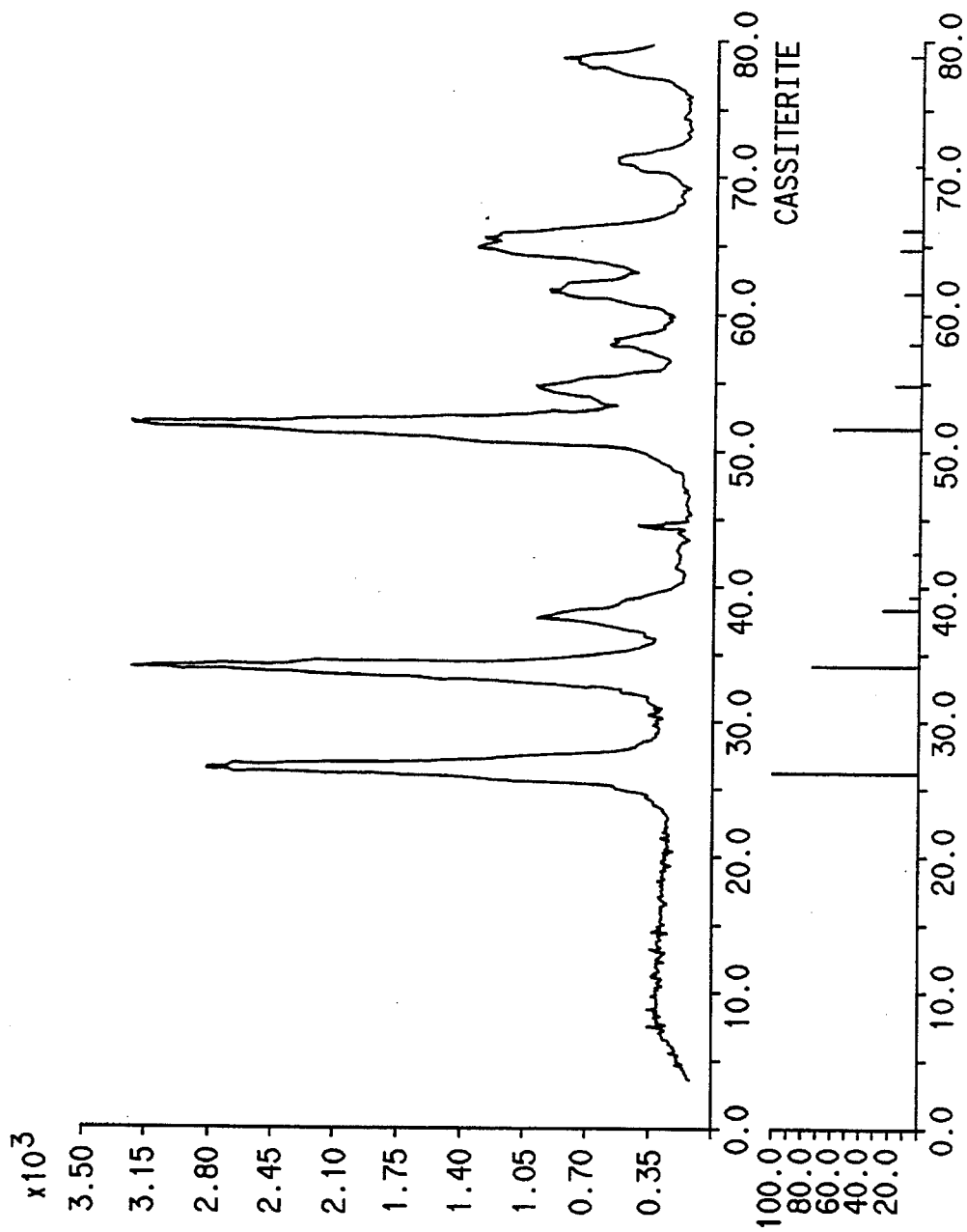
FIG. 7—FIG. 7 is an X-ray diffraction pattern for the powder produced in accordance with Example 10.

FIG. 7 is an X-ray diffraction pattern that was generated for the powder produced in accordance with Example 10.

EXAMPLE 11

Approximately 9.0 g of precipitated $SnO_2$ and 1.0 g of $H_3PO_4$ were combined in a platinum crucible and dried in air for approximately 30 minutes at a temperature of about 200 degrees C. The resulting powder was ground with a mortar and pestle, and then calcined in nitrogen at about 800 degrees C. for approximately 6 hours followed by cooling under nitrogen.

The calcined product contained 7.05% $P_2O_5$ as determined by X-ray fluorescence spectrometry. The dry powder resistivity of the calcined produce was about 10.65 ohm-cm, and had an average crystallite size of about 73 Angstrom.

Figure 8:
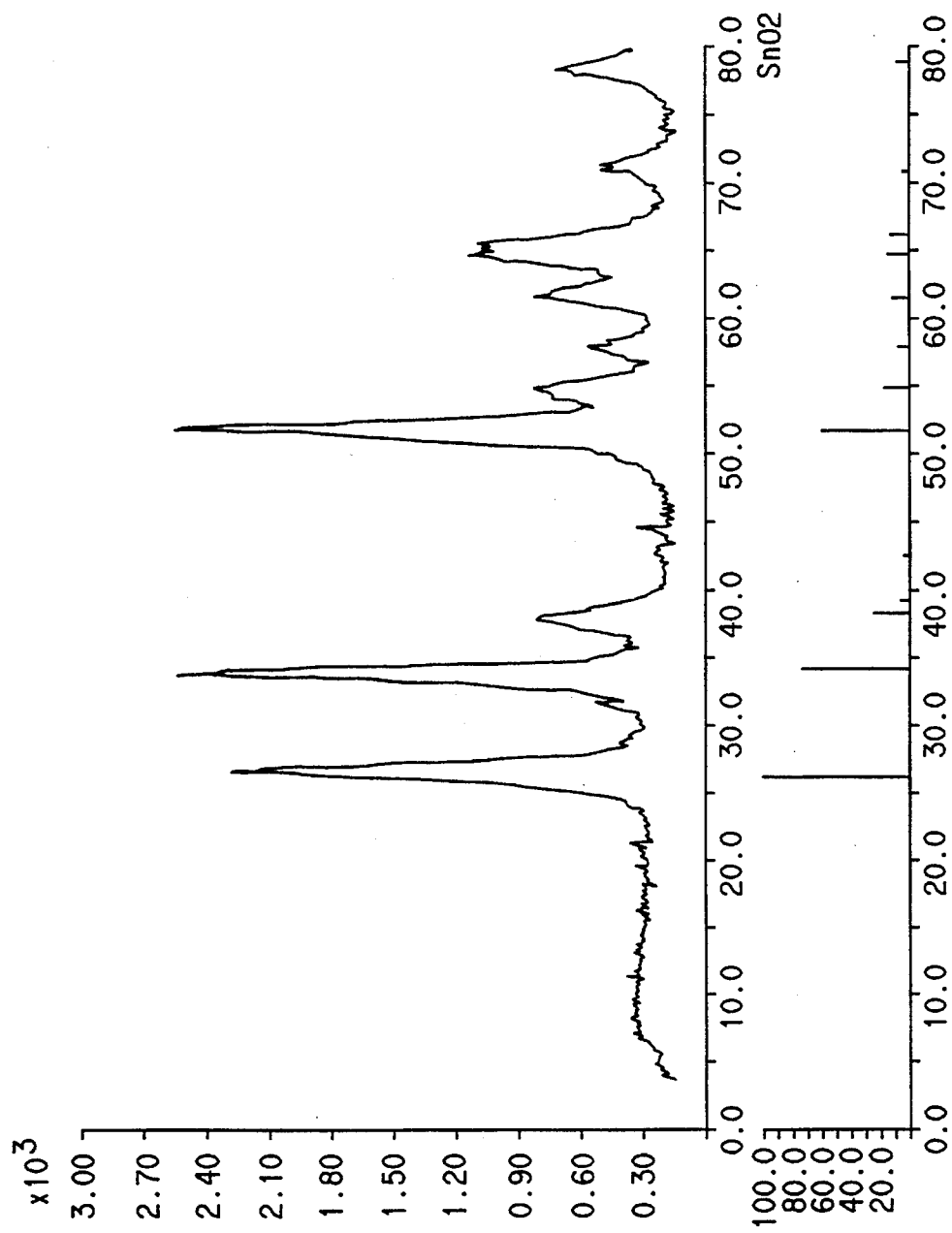
FIG. 8—FIG. 8 is an X-ray diffraction pattern for the powder produced in accordance with Example 11.

FIG. 8 is an X-ray diffraction pattern that was generated for the powder produced in accordance with Example 11.

EXAMPLE 12

Finely ground, calcined $SnO_2$/3%$P_2O_5$ doped electroconductive powder, which was made substantially in accordance with Example 6 and having an average particle size of about 1 microns (sonicated), was used as a solid filler in an aqueous-based paint dispersion of "HTV" varnish ("High Temperature Varnish", SS-10541 from Werneke-Long, Inc., Tinley Park, Ill., 50% HTV/50% $H_2O$ dispersion). About 7.5% weight concentration of the $SnO_2$/3%$P_2O_5$ powder was used in the aqueous HTV dispersion.

A "drawdown" was made on a glass plate using a wet-film applicator giving an approximately 0.003 inch wet film thickness of the aqueous $SnO_2$/$P_2O_5$/HTV resin suspension on the glass plate. After drying for about 14 hours, the surface resistivity of the conductive coating was measured, using a commercially available milli-to-2 ohmmeter (Dr. Thiedig Corp.) and a Model 803A surface/volume resistivity probe (Monroe Electronics Inc., Lyndonville, N.Y.). The instrument gave direct readings of surface resistivity in ohms per square. The lower the surface resistivity, the higher the electroconductivity of the film.

The coating was conductive and had a surface resistivity of about $4.1 \times 10^5$ ohms/square. On an areal basis this coating contained about 1.58 lbs. of $SnO_2$/3%$P_2O_5$ powder per 1000 square feet.

EXAMPLE 13

Finely ground, calcined $SnO_2$/0.5%$Ta_2O_5$ doped electroconductive, which was prepared substantially in accordance with Example 1 and having an average particle size of about 0.7 microns (sonicated) was used as a solid filler in an aqueous-based paint dispersion of "HTV" varnish by using the same procedure described in Example 12; except that about 14% weight concentration of the $SNO_2$/0.5% $Ta_2O_5$ doped powder was used. A "drawdown" was made as described in Example 13 and surface resistivity was measured.

The coating was found to be conductive, with a surface resistivity of about $1.6 \times 10^7$ ohms/square. On an areal basis the coating contained approximately 1.17 lbs. of $SnO_2$/$Ta_2O_5$ powder per 1000 square feet.

EXAMPLE 14

Finely ground calcined $SnO_2$/3%$P_2O_5$ doped electroconductive powder, which was prepared substantially in accordance with Example 6 and having an average particle size of about 1 micron (sonicated) was used as the conductive filler ("pigment") in an aqueous-based acrylic paint dispersion of "Carboset" acrylic emulsion (Carboset XPD-1780, approximately 50% solids, 50% water emulsion, from B. F. Goodrich Co.). A quantity of aminopropanol was added to the dispersion to adjust the pH to about 8. A pigment to binder ratio of 1:3.5 was used and the dispersion mixture was milled intensively for about 4 hours on a horizontal media mill (made by Eiger Machinery Company) at approximately 3500 rpm. After milling, the dispersion was diluted with water to achieve a conductive pigment concentration of about 2.2% while under strong agitation using a high speed disk disperser. Drawdowns of the dispersion were made on thin, transparent polyester film using a wet-film applicator giving approximately 0.0012 inch thick wet film thickness. The coating on the film was allowed to dry for about 14 hours.

Surface resistivity measurements showed the coated film to be conductive in the static dissipative range, at about $10^{11}$ ohms per square. The film was transparent, having an "IRT"/dollar bill transparency of about 17 inches, and a haze value of about 34 %. The measurement of distance of whiteness showed $L^*=96.95$, $a^*=-0.67$, $b^*=1.99$ and based on these values, a calculated "distance from whiteness" of about 13.71 which corresponds to a very light shade close to white.

EXAMPLE 15

An electroconductive powder of SnO$_2$/10% Sb doped (sold under the trademark "ECP-3010XC" by the DuPont Co., Wilmington, Del.), having an average particle size of about 2 microns (sonicated) was used as the conductive filler ("pigment") in an aqueous-based acrylic paint dispersion within "Carboset" acrylic emulsion (refer to Example 14). A pigment to binder ratio of about 1:3.5 was used, and the dispersion mixture was bail-milled for about 24 hours by using 6 mm diameter glass balls. After milling, the dispersion was diluted with water, while stirring, to a conductive pigment concentration of about 3% by wt.

Drawdowns of the diluted dispersion were made on thin, transparent polyester film using a wet-film applicator giving approximately 0.0012 inch wet film thickness. The coating was allowed to dry for about 14 hours. Surface resistivity measurements showed the film to be conductive in the static dissipative range, at about $4\times10^6$ ohms per square. The film was transparent, having an "IRT"/dollar bill transparency of about 18 inches and a haze value of about 34%. The film had a bluish-gray tint and measurement of distance of whiteness showed $L^*=95.0$, $a^*=-0.32$, $b^*=1.05$ and, based on these values, a calculated "distance from whiteness" of about 26.2.

This example illustrates that the ECPs of the invention possess a desirable color in comparison to antimony containing ECPs.

EXAMPLE 16

An electroconductive powder of mica coated with antimony-doped tin oxide (sold under the trademark "ECP-1410M" by the DuPont Co., Wilmington, Del.) was "harshmicronized" on an air-jet micronizer, giving a powder having an average particle size of about 5.5 microns (sonicated). This powder was used as the conductive filler ("pigment") in an aqueous-based acrylic paint dispersion of "Carboset" acrylic emulsion (refer to Example 14). A pigment to binder ratio of about 1:3.5 was used, and the mixture was dispersed on a disk disperser for about 30 minutes at about 3300 rpm using a 2 inch diameter serrated disk. After forming the dispersion, the dispersion was diluted with water, while stirring, to a conductive pigment concentration of about 3% by wt.

Drawdowns of the diluted dispersion were made on thin, transparent polyester film using a wet-film applicator giving approximately 0.0012 inch wet film thickness. The coating was allowed to dry for about 14 hours. Surface resistivity measurements showed the film to be conductive in the static dissipative range, at about $3\times10^6$ ohms per square. The film was highly transparent, almost window-pane clarity, having a haze value of only about 11%. The coated film was essentially colorless when visually observed.

EXAMPLE 17

Finely ground, calcined SnO$_2$/3%P$_2$O$_5$ doped electroconductive powder, which was formed substantially in accordance with Example 6 and having an average particle size of about 1 micron (sonicated), was used as the conduction filler ("pigment") in an all-organic polyester resin dispersion. The polyester resin used was grade Vitel 2200 from Shell Oil Co. and the solvent was MEK (methylethylketone, water-free) from Baker Co. A pigment-to-binder ratio of about 140:100 was used at about 40% solids (60% solvent). The mixture was milled intensively for approximately 4 hours on a horizontal media mill (made by the Eiger Machinery Co., Inc.) at about 4500 rpm.

After milling the mixture, drawdowns of the milled mixture were made on thin, transparent polyester film, using a #5 wire wound rod applicator. The coating was dried in air and baked at about 60 degrees C. for approximately 30 minutes. The coated film had good transparency, having an "IRT"/Dollar bill transparency of about 51 inches, and a haze value of about 49%. The coating had good conductivity, having a surface resistivity value of about $10^8$ ohms per square.

Next, a first sample of the same conductive, coated film was overcoated by hand, using tissue paper as an applicator with a very thin coating of mineral oil (grade "Vaseline"), and a second sample was over-coated with a very thin coating of a fluorinated lubricant (sold under the trademark "Krytox oil, GPL 102" by the DuPont Co., Wilmington, Del.). Transparency and electrical surface resistivity were measure on both samples after the very thin overcoats were applied. It was found that transparency of both samples increased substantially after overcoating without significant increases in surface resistivity. In the case of the Mineral oil/Vaseline coated sample, the haze value dropped to about 26.5% and surface resistivity was the same at about $10^8$ ohms/square. In the case of the "Krytox Oil GPL 102" coated sample, the haze value dropped to about 42.5% and surface resistivity was about the same, i.e., about $10^8$ ohms/square.

EXAMPLE 18

An electroconductive powder of SnO$_2$/10%Sb doped (sold under the trademark "ECP-3010XC" by the DuPont Co., Wilmington, Del.), having an average particle size of about 2 microns (sonicated) was used as the conductive filler ("pigment") in an all organic polyester resin dispersion. The polyester resin used was grade Vitel 2200 from Shell Oil Co. and the solvent was MEK (methylethylketone, water-free) from Baker Co. A pigment-to-binder ratio of about 120:100 was used at about 40% solids (60% solvent). The mixture was milled for about 90 minutes on a horizontal media mill (made by the Eiger Machinery Co., Inc.) at about 4000 rpm.

After milling the mixture, drawdowns of the mixture were made on thin, transparent polyester film, using a #5 wire-wound rod applicator. The coating was dried in air and baked at about 70 degrees C. for approximately 30 minutes. The coated film had good transparency, having a haze value of about 25%, and it had good conductivity, having a surface resistivity of about $10^8$ ohms per square.

Next, a first sample of the same conductive coated film was over-coated by hand, using tissue paper as an applicator, with a thin coating of Mineral oil ("Vaseline"), and a second sample was over-coated with a very thin coating of a fluorinated lubricant (sold under the trademark "Krytox oil, GPL 102" by the DuPont Co, Wilmington, Del.). Transparency and electrical surface resistivity were measured on both samples after the thin overcoats were applied. It was found that transparency of both samples increased substantially after overcoating without significant increases in surface resistivity. In the case of the Mineral Oil/vaseline coated sample, the haze value dropped to about 6% and surface resistivity was the same at about $10^8$ ohms/square. In the case of the "Krytox Oil GPL 102" coated sample, the haze value dropped to about 16% and surface resistivity was about the same, i.e., about $10^8$ ohms/square.

Comparative Example 19

This Example illustrates that the powder, which can be produced in accordance with the instant invention, can be substantially pyrochlore free.

A first electroconductive powder produced substantially in accordance with Example 1 was analyzed by using the previously described conventional X-ray diffraction pattern techniques. This powder contained about 2 wt % tantalum.

A second powder was prepared substantially in accordance with the method described in U.S. Pat. No. 4,707,346, and was also analyzed by using X-ray diffraction. The second powder contained about 1.45 wt % tantalum.

FIG. 9 is a graphical comparison of the X-ray diffraction patterns for the first and second powders. Referring now to FIG. 9, plot "A" corresponds to the X-ray diffraction pattern for the powder produced in accordance with instant Example 1, and plot "B" corresponds to the X-ray diffraction pattern for a powder produced in accordance with U.S. Pat. No. '346. The characteristic peak for pyrochlore is indicated on FIG. 9. FIG. 9 illustrates that plot "A", i.e., the plot for the powder produced by instant Example 1, lacks the pyrochlore peak whereas plot "B" indicates that pyrochlore is present in the powder of U.S. Pat. No. '346.

Given that pyrochlore is a tantalum containing phase, the ability of the instant invention to avoid the presence of pyrochlore when employing relatively large amounts of tantalum is a surprising and an unexpected result.

While certain aspects of the invention have been described above in detail, an artisan in this art will appreciate that other embodiments and variations are encompassed by the appended claims.

The following is claimed:

1. An electroconductive powder consisting essentially of about 0.1 to 10% by weight of silica and tin oxide doped with tantalum wherein said powder is substantially free of pyrochlore.

2. An electroconductive powder consisting essentially of about 0.1 to 10% by weight of silica and tin oxide doped with at least one member selected from the group of tantalum and niobium; wherein said powder is substantially free of pyrochlore.

3. An electroconductive powder consisting essentially of tin oxide which has been doped with phosphorus and at least one member from the group of Ta and Nb.

4. The electroconductive powder of claim 1, 2 or 3 wherein the distance from whiteness is less than about 20%.

5. The electroconductive powder of claim 1, 2 or 3 wherein said dopant ranges from about 0.25 to 15 wt % based upon the tin oxide.

6. The electroconductive powder of claim 1, 2 or 3 wherein said powder comprises crystallites that range is size from about 40–500 Angstroms.

7. The electroconductive powder of claim 1, 2 or 3 wherein said powder has a dry powder resistivity of about 0.1 to 1,000 Ohms.

8. The electroconductive powder of claim 3 further consisting essentially of silica.

\* \* \* \* \*